(12) United States Patent
Hansen

(10) Patent No.: US 6,815,888 B2
(45) Date of Patent: Nov. 9, 2004

(54) HALOGEN LAMPS, FILL MATERIAL AND METHODS OF DOSING HALOGEN LAMPS

(75) Inventor: Steven C. Hansen, Urbana, IL (US)

(73) Assignee: Advanced Lighting Technologies, Inc., Solon, OH (US)

( * ) Notice: Subject to any disclaimer, the term of this patent is extended or adjusted under 35 U.S.C. 154(b) by 338 days.

(21) Appl. No.: 09/782,204

(22) Filed: Feb. 14, 2001

(65) Prior Publication Data

US 2003/0160565 A1 Aug. 28, 2003

(51) Int. Cl.[7] ................................. H01J 17/24
(52) U.S. Cl. ..................... 313/562; 313/553
(58) Field of Search ................. 313/562, 553, 313/557, 558, 561

(56) References Cited

U.S. PATENT DOCUMENTS

| | | |
|---|---|---|
| 3,676,534 A | 7/1972 | Anderson |
| 3,728,572 A | 4/1973 | Maier et al. |
| 4,305,017 A | 12/1981 | Kuus et al. |
| 4,413,205 A | 11/1983 | Ooms |
| 4,463,277 A | 7/1984 | DeCaro |
| 4,469,980 A * | 9/1984 | Johnson ................... 313/25 |
| 4,559,278 A | 12/1985 | Nagy et al. |
| 4,710,679 A * | 12/1987 | Budinger et al. ............ 313/17 |
| 4,864,191 A | 9/1989 | Van De Weijer et al. |
| 4,894,584 A | 1/1990 | Steinmann et al. |
| 4,973,880 A | 11/1990 | Honda et al. |
| 6,060,829 A | 5/2000 | Kubon et al. |

FOREIGN PATENT DOCUMENTS

DE 199 29 463 6/1999

OTHER PUBLICATIONS

C. Sims, "Rhenium," Symposium on Rhenium, pp. 29–31, 1962, Amsterdam.
H. Muller, R. Wachinski, Inorganic and Nuclear Chem. Letters, 8, pp. 413–415, 1972, Oxford.

* cited by examiner

*Primary Examiner*—Joseph Williams
(74) *Attorney, Agent, or Firm*—Duane Morris LLP

(57) ABSTRACT

A pelletized lamp fill material suitable for delivering a precise quantity of rhenium and a halogen into the light emitting chamber of a tungsten halogen lamp. The pellet is formed by pressure aggregating a mixture of a metal powder and a rhenium-halogen compound. In a pellet suitable for delivering bromine into the lamp, the metal powder may be mixed with rhenium tribromide powder to form the pellet. The release of the bromine and rhenium is desirably controlled over time as a function of temperature.

61 Claims, 7 Drawing Sheets

Isothermal sublimation of $ReBr_3$ from $Re\text{-}ReBr_3$.

Density: 60%
Pressure: 1 atmosphere argon
Composition: 99.5% Re, 0.5% $ReBr_3$ by weight Isothermal sublimation of ReBr$_3$ from Pd-ReBr$_3$.

Density: 80%
Pressure: 1 atmosphere argon
Composition: 99% Pd; 1% ReBr$_3$ by weight Isothermal sublimation of ReBr$_3$ from Pd-Re-W-ReBr$_3$.

Density: 76%
Pressure: 1 atmosphere argon
Composition: 33% Pd, 33% Re, 33% W, 1% ReBr$_3$ by weight Isothermal sublimation of $ReBr_3$ from $Re-ReBr_3$.

Density: 55%
Pressure: 1 atmosphere argon
Composition: 75% Re, 25% $ReBr_3$ by weight
Temperature: 485°C

HALOGEN LAMPS, FILL MATERIAL AND METHODS OF DOSING HALOGEN LAMPS

BACKGROUND OF THE INVENTION

The present invention relates to halogen lamps having a sealed light emitting chamber and a tungsten filament positioned within the chamber. More specifically, the present invention relates to a pelletized lamp fill material for delivering precise amounts of rhenium and a halogen into halogen lamps and methods of dosing halogen lamps with lamp fill material.

Halogen lamps have found widespread use in a variety of applications such as automobile headlamps, flood lamps, and photographic lamps. The typical halogen lamp comprises a hermetically sealed light emitting chamber having a tungsten filament mounted internally of the chamber. The chamber is typically formed from a light transmitting material such as glass. The chamber also includes an inert fill gas such as xenon at a pressure of about seven atmospheres at room temperature.

During operation of the halogen lamp, the tungsten filament is heated to incandescence by the passage of electrical current. At full brightness, parts of the filament may reach temperatures as high as about 3000° C. while the temperature of the cooler parts of the filament is typically in the range of about 600° C. to about 1300° C. During lamp operation, tungsten will vaporize from the filament and condense at the cold spot of the lamp which is typically located on the wall of the light emitting chamber. The condensed tungsten causes the chamber wall to progressively blacken during the life of the lamp which undesirably reduces the light output of the lamp during its useful life. It is known to add a halogen to the lamp in an amount to maintain a halogen partial pressure in the lamp sufficient to effect the formation of halogen-tungsten and/or halogen-oxygen-tungsten compounds. The halogen-tungsten and/or halogen-oxygen-tungsten compounds transport the tungsten back to the filament in a cycle known as the tungsten regenerative cycle. Tungsten halogen lamps having a tungsten regenerative cycle have been found to experience reduced wall blackening and thus maintain a relatively constant luminous output during their useful life.

One common halogen used in such lamps to effect the tungsten regenerative cycle is bromine. The known methods for dosing the lamp with a sufficient amount of bromine to effect the tungsten halogen cycle include dosing the lamp with methyl bromide ($CH_3Br$), methylene bromide ($CH_2Br_2$), bromine gas ($Br_2$), and hydrogen bromide (HBr). However, the known methods suffer from several disadvantages. For example, methyl bromide and methylene bromide are toxic and also contaminate the lamp with carbon which is detrimental to the performance of the lamp. Thus these compounds are undesirable as a lamp fill material. Bromine and hydrogen bromide are very corrosive and thus undesirable as a lamp fill material. Accordingly, there is a need for a solid lamp fill material including a sufficient amount of a halogen to effect the tungsten regenerative cycle and methods of dosing lamps which obviates the deficiencies of the known lamp fill materials and methods.

The tungsten filament in halogen lamps is susceptible to corrosion due to the presence of the halogen in the lamp. Wells or craters form in cooler regions of the tungsten filament where the filament temperature is in the range of about 600° C. to about 1300° C. Such well formation may dramatically shorten the useful life of the lamp. It is known that rhenium present at the surface of the tungsten filament inhibits well formation on the filament. Thus it is desirable to deliver a sufficient amount of rhenium to the surface of the filament.

The U.S. Pat. No. 4,413,205 to Ooms discloses that well formation on tungsten filaments may be reduced by forming the filament from a tungsten-rhenium alloy so that small quantities of rhenium are present at the surface of the filament. It is disclosed by Ooms that the well formation on a filament formed from a tungsten-rhenium alloy having one percent rhenium by weight is only very superficial and that no observable well formation occurs on a filament having three percent rhenium by weight.

However, rhenium is an expensive alloying element and lamp filaments formed from a tungsten-rhenium alloy are expensive to manufacture. Further, in an alloy, much of the rhenium is not at the surface of the filament and thus is not effective in preventing well formation. Thus significant cost savings may be realized by delivering sufficient rhenium to the surface of a tungsten filament to reduce well formation rather than forming the filament from a tungsten-rhenium alloy.

The published German Patent Application No. DE 199 29 463 to Dittmer et al. discloses that rhenium present in a lamp from the decomposition of a rhenium halide will deposit on the cooler parts of the tungsten filament during operation of the lamp. The presence of rhenium at the surface of a filament formed from only tungsten has been found to inhibit well formation on the filament The mechanism by which the presence of rhenium inhibits well formation remains unexplained.

According to the present invention, the necessary quantities of rhenium and bromine may be introduced into the lamp in a solid lamp fill material comprising rhenium tribromide (referred to herein as $ReBr_3$ while recognizing that rhenium tribromide exists in the solid and gas phases as the trimeric molecule $Re_3Br_9$). Thus rhenium and bromine may be introduced into the lamp without the introduction of any unnecessary compounds or elements which may have deleterious effects on the operation of the lamp.

Rhenium tribromide exists at room temperature as a solid and can be prepared from the elements and formed into a powder. Rhenium tribromide begins to sublime at temperatures greater than about 200° C. and begins to decompose into rhenium and bromine at temperatures greater than about 400° C. Thus when the rhenium tribromide contacts the cooler parts of the tungsten filament at temperatures between about 600° C. and 1300° C., the rhenium tribromide will decompose, enabling the rhenium to function as an inhibitor of filament well formation and enabling the bromine to effect the tungsten regenerative cycle.

The amount of rhenium tribromide necessary to deliver the desired amounts of rhenium and bromine into the lamp may vary. Dittmer et al. disclose that a halogen lamp with a volume of 1–2 ml containing a sufficient amount of $Re_3Br_9$ or $Re_3Cl_9$ to sustain a rhenium halide pressure of 0.3 mbar during operation of the lamp results in the formation of a rhenium layer with a thickness between 20–400 nm on the colder portions of the tungsten filament and leads. Assuming a cold spot temperature of about 700° K. (427° C.), an amount of 6.7 $\mu$g per cubic centimeter of $ReBr_3$ is necessary to attain a pressure of 0.3 mbar $ReBr_3$ in the lamp. Because such small quantities of rhenium tribromide are desired, it is very difficult to dose the small quantities necessary into the lamp with the rhenium tribromide in the form of a powder. Thus there exists a need for a solid lamp fill material in the form of a particle or pellet which may easily deliver the desired quantities of rhenium tribromide into the lamp, and which will release the bromine and rhenium over time.

The U.S. Pat. No. 3,676,534 to Anderson discloses a method of forming particles suitable for dosing lamps with precise amounts of lamp fill material. However, such a method is unsuitable for forming a particle comprising rhenium tribromide because rhenium tribromide will not melt and thus cannot be formed into a particle.

According to the present invention, a pellet may be formed which is suitable for delivering precise amounts of rhenium and a halide in the desired quantities into a lamp by mixing a rhenium halide powder with a powder comprising one or more metals and pressure aggregating the mixture to form a pellet. Thus novel lamp fill materials and methods of dosing lamps have been found which obviate the deficiencies of the known materials and methods.

Accordingly, it is an object of the present invention to provide a novel lamp fill material and method of dosing lamps which obviates the deficiencies of the known materials and methods.

It is another object of the invention to provide a novel lamp fill material for delivering precise amounts of rhenium and a halogen into a lamp without introducing other elements into the lamp.

It is another object of the present invention to provide a novel lamp fill material in the form of a pellet comprising rhenium and a halogen.

It is yet another object of the present invention to provide a novel lamp fill material in the form of a pellet comprising rhenium tribromide and a metal.

It is still another object of the present invention to provide a novel lamp fill in the form of a pellet including only rhenium and bromine.

It is a further object of the present invention to provide a novel method of delivering a precise amount of rhenium and a halogen into a lamp in the form of a pellet.

It is yet a further object of the present invention to provide a novel method of forming pellets comprising a metal and rhenium tribromide.

It is still a further object of the present invention to provide a novel halogen lamp and method of dosing a halogen lamp with a lamp fill material comprising a pellet including rhenium and a halogen.

It is another object of the present invention to provide a novel lamp fill material in the form of a pellet comprising the elements necessary to inhibit tungsten filament well formation and effect a tungsten regenerative cycle in a tungsten halogen lamp.

It is yet another object of the present invention to provide a novel lamp fill material capable of the release of bromine and rhenium over time.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1A:
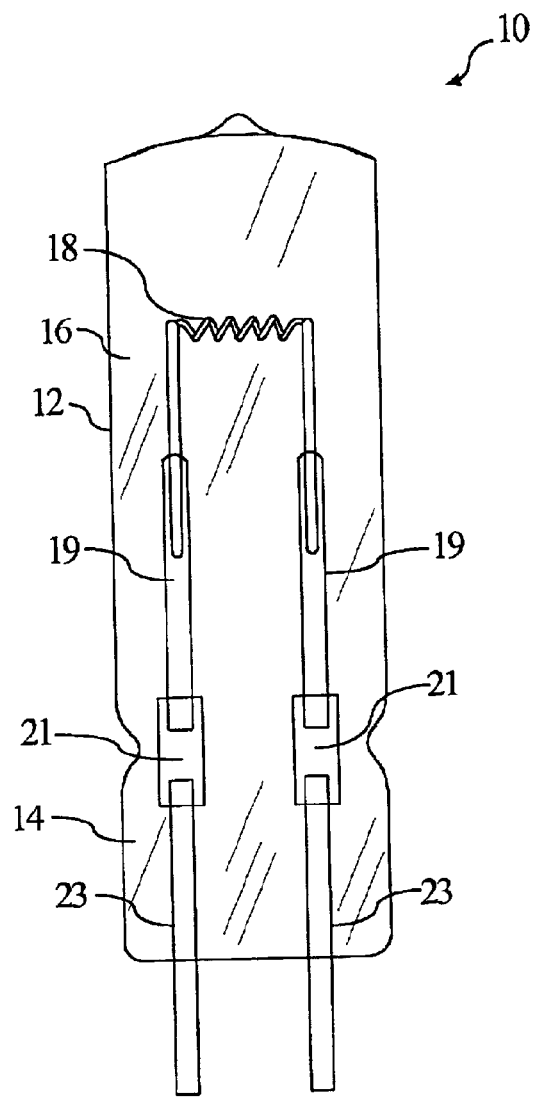
FIG. 1a is a schematic illustration of a single ended halogen lamp.
Figure 1B:
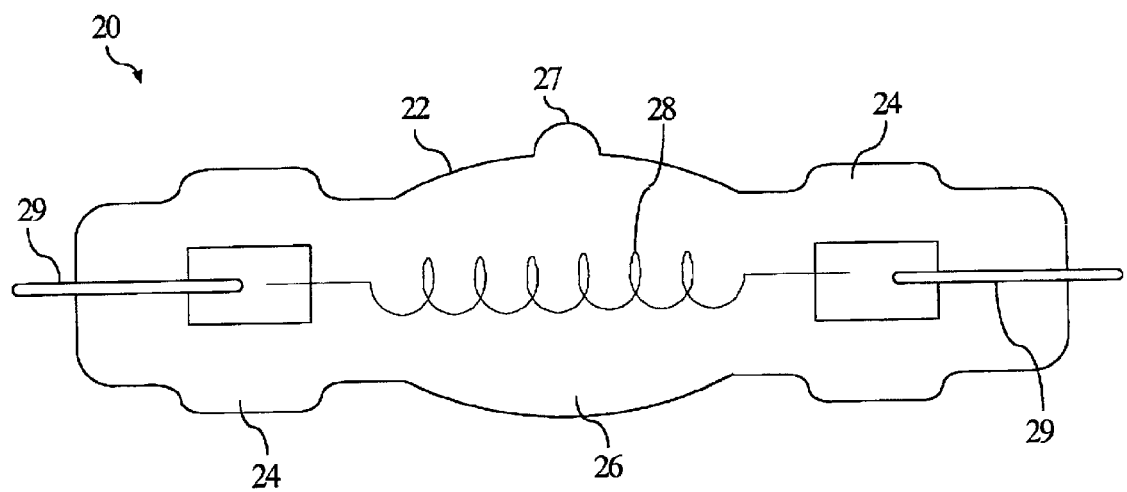
FIG. 1b is a schematic illustration of a double ended halogen lamp.

FIGS. 1a and 1b illustrate typical tungsten halogen lamps. With reference to FIG. 1a, the lamp 10 includes an outer lamp envelope 12 of light transmitting material which is hermetically sealed by a single pinch seal 14 to form the light emitting chamber 16. Such a lamp with a single pinch seal is known as a single ended halogen lamp. The tungsten filament 18 is mounted internally of the chamber 16 and is electrically connected to leads 19 which each provide an electrical connection to the exterior of the chamber 16 through foils 21 and outer leads 23.

With reference to FIG. 1b, the lamp 20 includes the outer lamp envelope 22 which is hermetically sealed by a pinch seal 24 at each end thereof to form the light emitting chamber 26. Such a lamp having a pinch seal at each end thereof is known as a double ended halogen lamp. The tungsten filament 28 is mounted internally of the chamber 26 and is electrically connected to leads 29 which each provide an electrical connection to the exterior of the chamber 26.

The lamps 10,20 are illuminated by heating the filaments 18,28 to incandescence by the passage of electrical current therethrough.

The outer lamp envelope 12,22 is formed from light transmitting material such as glass. The lamp envelope 12,22 typically includes a sealed tip 17,27 which constitutes the residue of a tube through which the chamber 16,26 is evacuated and then charged with a suitable inert fill gas and the desired dose of lamp fill material. The inner diameter of the tube in such lamps 10,20 is typically about 2 mm and thus any solid lamp fill material must be capable of fitting through the tube for delivery into the chamber 16,26.

For the aforementioned reasons, it is desirable to dose tungsten halogen lamps with precise quantities of rhenium and a halogen. While the present invention applies to lamp fill material comprising rhenium and any appropriate halogen such as bromine, chlorine, or iodine, the invention will be described with reference to a lamp fill material comprising bromine. In a preferred embodiment of the present invention, the fill material comprises rhenium tribromide.

In a preferred embodiment, a pellet suitable for delivering a precise dose of rhenium and bromine into a tungsten halogen lamp may be formed by mixing a metal powder with rhenium tribromide powder and pressure aggregating the mixture to form a solid pellet. Although the mixture of powders may be pressed into any shape suitable for a lamp fill pellet, a cylinder, disc or sphere is typically formed. During size agglomeration by pressure, the powders are typically compacted to about 60–90% of the theoretical density of the metal matrix forming the pellet and thus the pellet obtains considerable mechanical strength. The lamp fill pellets made in sizes which facilitate handling during the dosing process are sufficiently strong to withstand the normal mechanical abuse associated with the dosing process. The lamp fill pellets resist fracture and abrasion during normal handling.

The metal powder may include only a single metal or an alloy of two or more metals. The metal powder may also be a mixture of powders of two or more metals, alloys, or metal and alloy. The metals or alloys suitable for the present invention must possess a high melting temperature and a low vapor pressure.

Further, in a preferred embodiment of the present invention wherein the metal powder is mixed with rhenium tribromide, it is desirable that the metal does not react with rhenium tribromide. The metals known to be candidates for the present invention include rhenium, platinum, palladium, rhodium, molybdenum, tungsten, and gold, and alloys or mixtures thereof.

In a preferred embodiment, the metal powder comprises rhenium. The rhenium powder is mixed with rhenium tribromide powder and the mixture is pressure aggregated into a pellet. The rhenium does not appear to react with the rhenium tribromide to form other stable bromides. The higher valent compounds $ReBr_4$ and $ReBr_5$ are known to exist and may be used in the present invention. Rhenium pentabromide decomposes into $Br_2$ and $ReBr_3$ at temperatures above about 110° C. Although less is known about $ReBr_4$, it will likely decompose into $ReBr_3$ and $Br_2$ when heated. The higher valent compounds $ReBr_6$ and $ReBr_7$ are not known to exist. The lower valent compounds $ReBr_2$ and $ReBr$ have never been conclusively identified and are not expected to be stable in the presence of bromine.

Although a typical tungsten halogen lamp requires a dose of between about 2 $\mu$g and about 2000 $\mu$g of rhenium tribromide for delivery of sufficient rhenium and bromine into the lamp chamber, the composition of the pellets according to the present invention is not limited to this range of rhenium tribromide. Pellets may be formed comprising less than 2 micrograms to several milligrams of rhenium tribromide. The specific amount of rhenium tribromide in the dose is dependent upon the volume of the lamp, the amount of halogen required for the regenerative cycle, and the thickness of the rhenium layer desired on the filament. Once the desired dose quantity of rhenium tribromide is determined, the amount of metal powder to be mixed with the rhenium tribromide is determined by the size limitations on the resultant pellet, i.e., the pellet must be large enough to facilitate the pressure aggregation process and handling during the dosing process but be small enough for passage through the exhaust tubulation and into the light emitting chamber of the lamp. There may also be a limitation on the maximum percentage of rhenium tribromide by weight which may be mixed with the metal powder and form a pellet which will not easily abrade or fracture.

In the preferred embodiment wherein the pellet is formed by mixing rhenium powder with rhenium tribromide powder, the preferred composition of the pellet comprises about 0.5 percent rhenium tribromide by weight and about 99.5 percent of the metal by weight. However, the pellet may comprise up to about 25 percent rhenium tribromide by weight.

The size of the individual grains comprising the metal powder used in forming the pellet is desirably less than 75 microns and preferably less than 30 microns.

The metal powder may be subject to hydrogen firing to remove excess oxygen to thereby prevent volatile rhenium oxides such as $Re_2O_7$ and $ReO_3$ from forming which will adversely affect lamp performance when vaporized during lamp operation.

The rhenium tribromide will react when exposed to moisture to form hydrogen bromide, rhenium dioxide or other rhenium oxides. Thus it is desirable to maintain the rhenium tribromide and the particles formed therewith in an inert atmosphere.

Figure 2A:
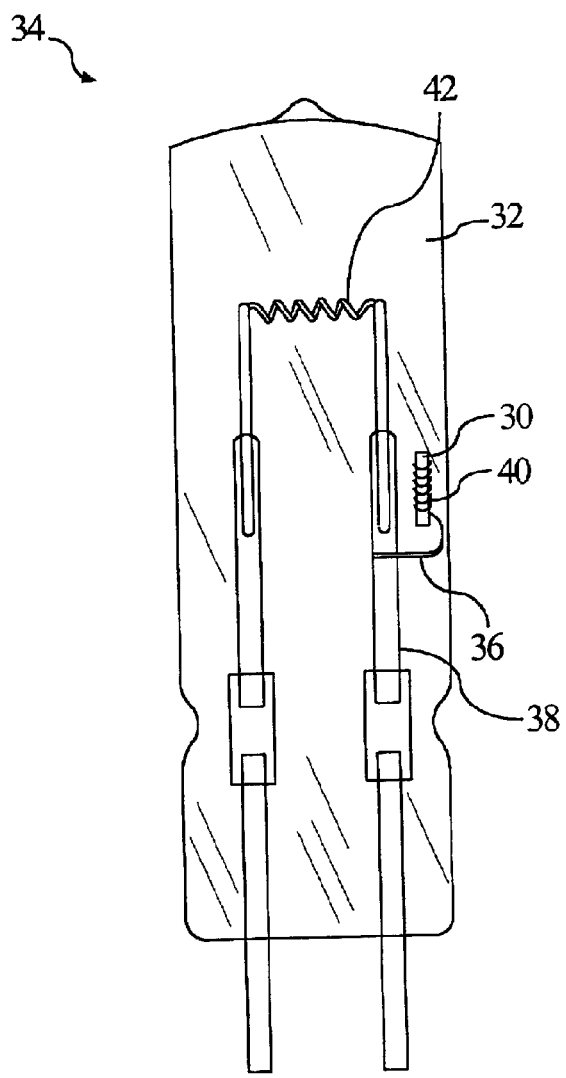
FIG. 2a is a schematic illustration of one embodiment of a single ended halogen lamp having a pellet according to the present invention mounted within the light emitting chamber of the lamp.
Figure 2B:
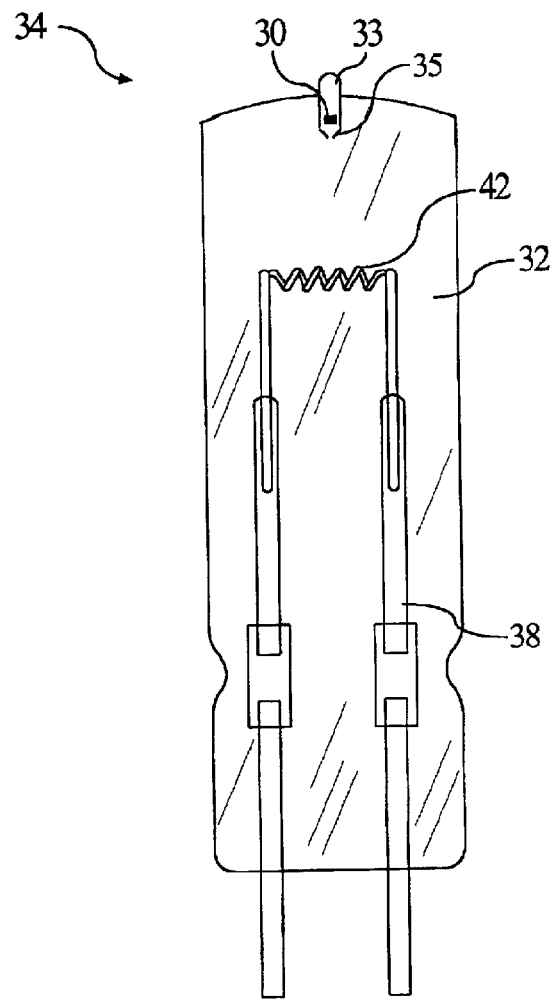
FIG. 2b is a schematic illustration of another embodiment of a single ended halogen lamp having a pellet according to the present invention mounted within the light emitting chamber of the lamp.
Figure 2C:
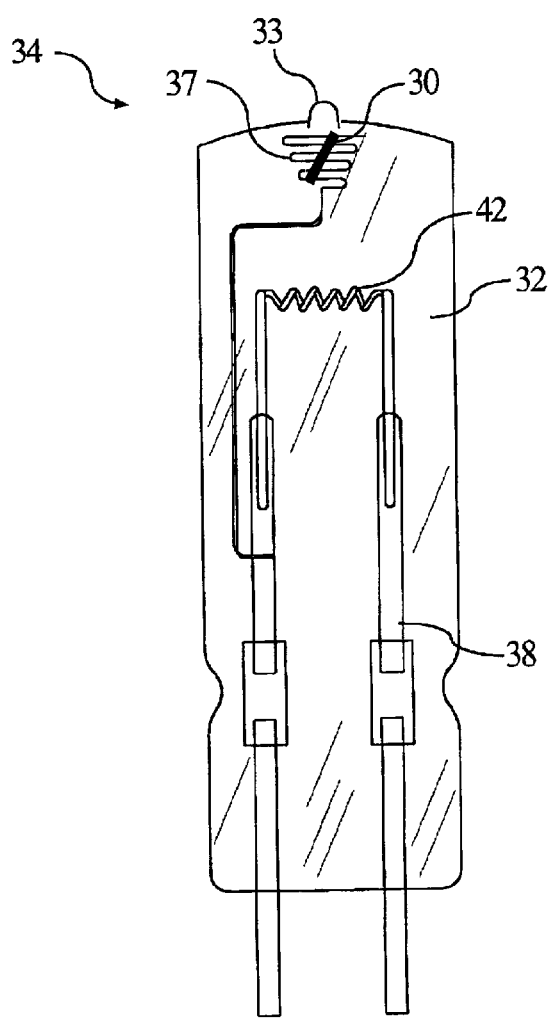
FIG. 2c is a schematic illustration of yet another embodiment of a single ended halogen lamp having a pellet according to the present invention mounted within the light emitting chamber of the lamp.
Figure 3:
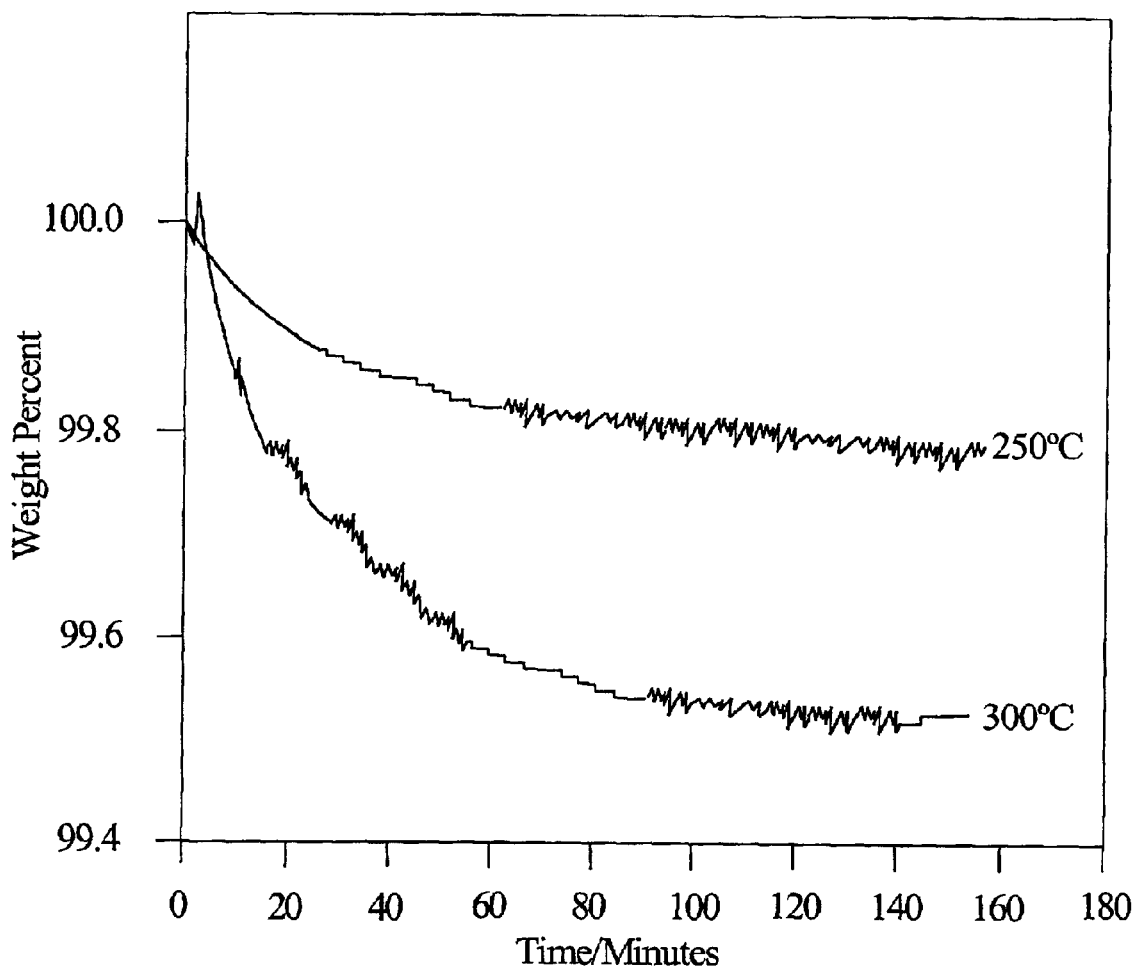
FIG. 3 is a graphical illustration showing the weight loss by sublimation of rhenium tribromide from a pellet formed according to Example 1.
Figure 4:
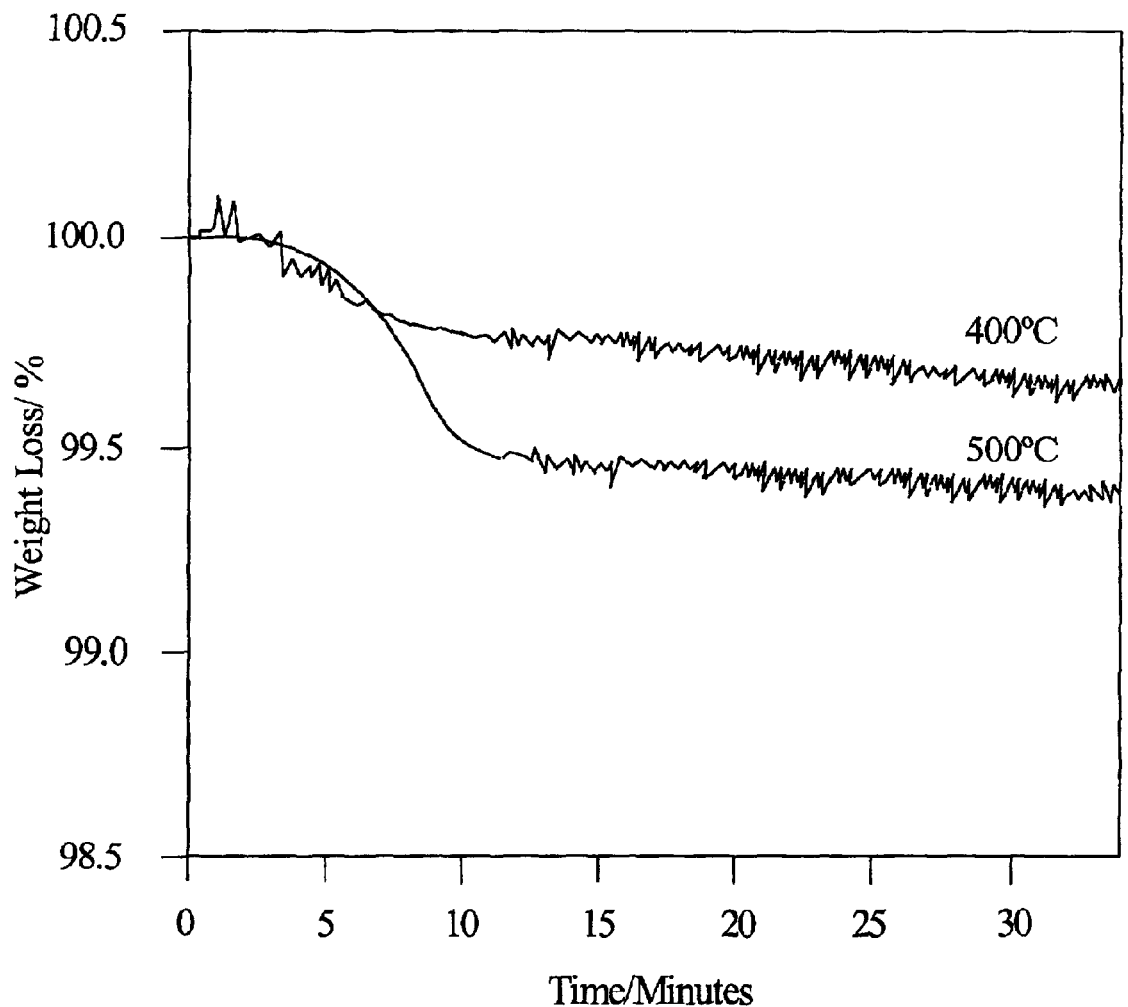
FIG. 4 is a graphical illustration showing the weight loss by sublimation of rhenium tribromide from a pellet formed according to Example 2.
Figure 5:
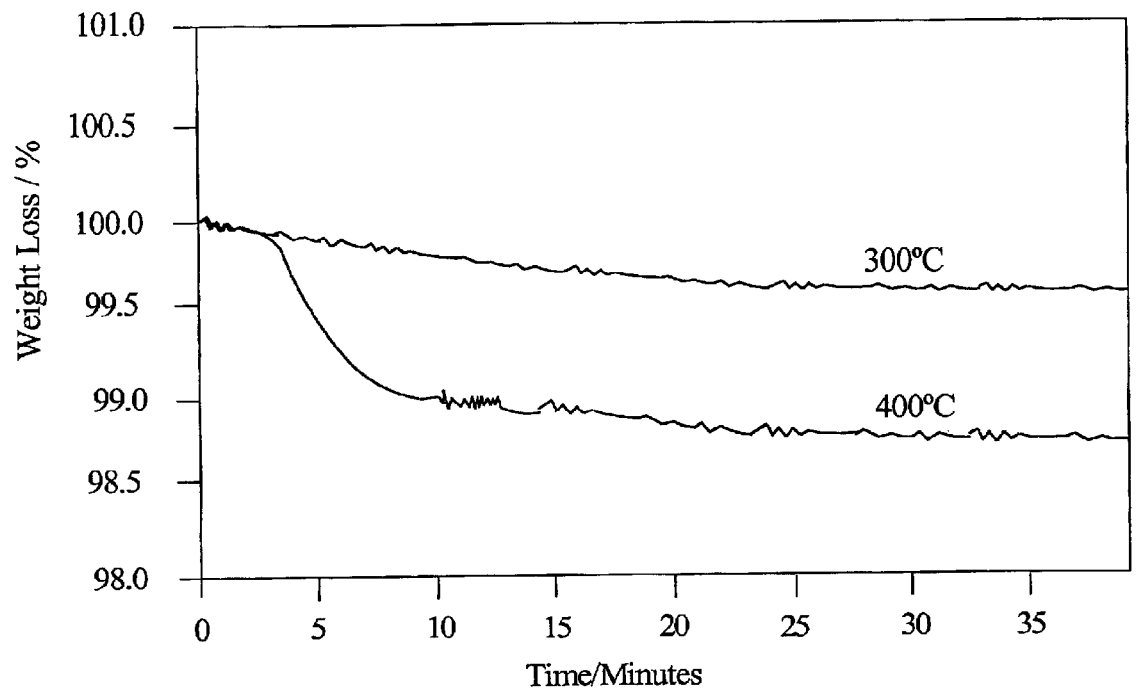
FIG. 5 is a graphical illustration showing the weight loss by sublimation of rhenium tribromide from a pellet formed according to Example 3.
Figure 6:
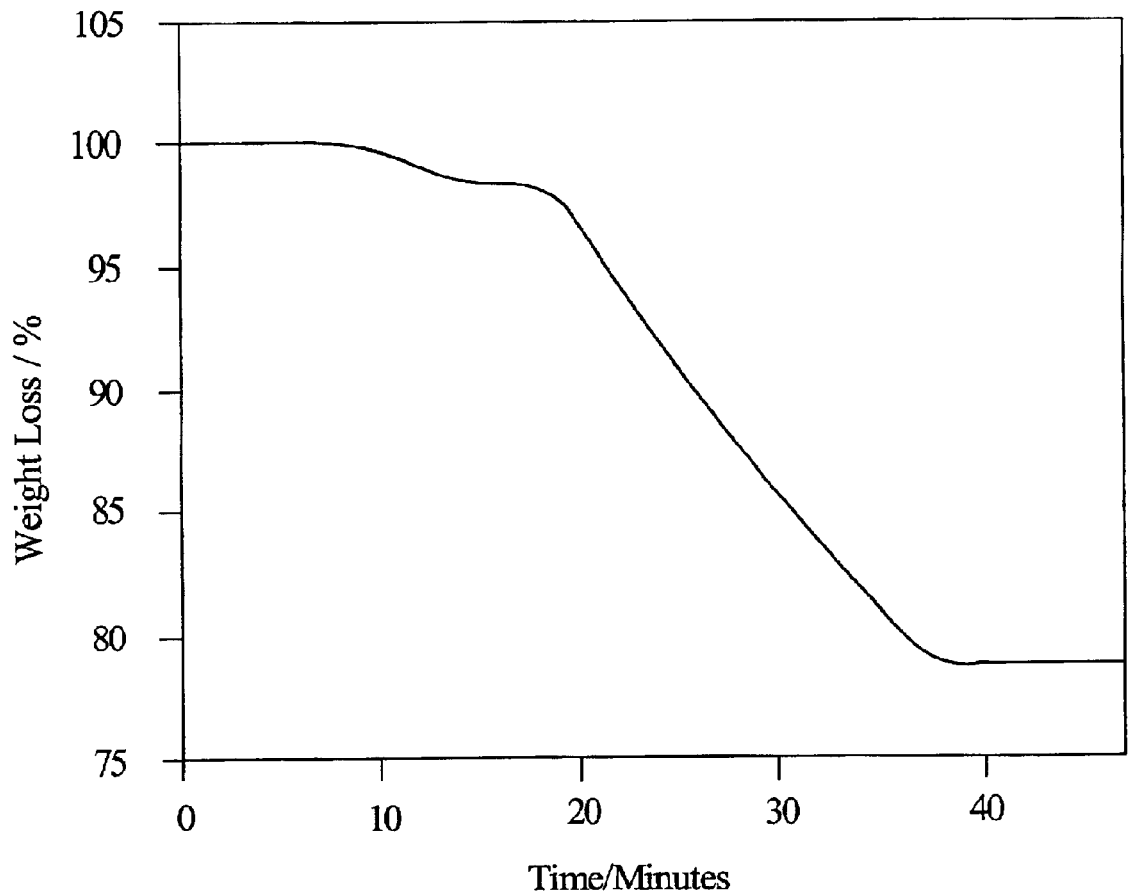
FIG. 6 is a graphical illustration showing the weight loss by sublimation of rhenium tribromide from a pellet formed according to Example 4.

The pellet may be dosed into the lamp and may freely move within the light emitting chamber of the lamp. Alternatively, the position of the pellet within the chamber may be fixed by mechanically mounting the pellet. FIGS. 2a, 2b, and 2c illustrate several of the embodiments of the mechanism for fixing the position of the pellet within a lamp according to the present invention. With reference to FIG. 2a, the pellet 30 is mounted within the light emitting chamber 32 of the lamp 34. In one embodiment, the pellet 30 may be mounted by mechanically securing a mounting clip 36 at one end to one of the lamp electrodes 38 and mechanically securing the pellet 30 to the clip 36. The clip 36 may form a coil 40 at the other end thereof. The coil 40 is then deformed around the pellet 30 received therein to thereby mechanically secure the pellet 30 to the clip 36. The fixed end of the clip 36 may be mechanically secured to the electrode by any conventional means such as a weld. The clip 36 may be formed from a molybdenum or tungsten wire.

With reference to FIGS. 2b and 2c, the pellet 30 may be trapped near the entry point of the exhaust tube 33 into the chamber 32. During the manufacture of the lamp 34, the exhaust tube 33 is tipped off to seal the chamber 32 after the lamp fill has been introduced into the chamber 32. One means of trapping the pellet near the entry point of the exhaust tube 33 is to reduce the diameter of the end 35 of the tube 33 within the chamber 32 as illustrated in FIG. 2b. An alternative means for trapping the pellet is to provide a wire basket 37 fixedly mounted at the tube 33 entry point as illustrated in FIG. 2c.

By mechanically securing the pellet 30 within the chamber 32, potential damage to the filament 42 from collision with an unsecured pellet may be avoided. Further, the pellet may be positioned within the chamber to control the temperature to which the pellet will be exposed during operation of the lamp.

EXAMPLE 1

In an inert atmosphere, 8.955 g of rhenium powder (−200 mesh) is blended with 0.045 g of rhenium tribromide powder so that the rhenium tribromide powder is nearly homogeneously distributed throughout the mixture. Approximately 16 mg of the mixture is placed in a cylindrical mold having an inside diameter of 1.6 mm. The unpressed mixture fills the mold to a height of 6.35 mm. The mixture is then pressed in the mold using hand pressure to form a disc-shaped pellet having a height of 0.64 mm. The pellet comprises about 80 $\mu$g of rhenium tribromide and has a density about 60% of the theoretical density of rhenium.

EXAMPLE 2

In an inert atmosphere, 0.9856 g of palladium powder (−200 mesh) is blended with 0.0094 g of rhenium tribromide powder so that the rhenium tribromide powder is nearly homogeneously distributed throughout the mixture. Approximately 50 mg of the mixture is placed in a cylindrical mold having an inside diameter of 1.6 mm. The mixture is then pressed in the mold using hand pressure to form a disc-shaped pellet having a height of 2.75 mm. The pellet comprises about 550 µg of rhenium tribromide and has a density about 80% of the theoretical density of palladium.

EXAMPLE 3

In an inert atmosphere, 0.986 g of palladium powder, 0.989 g of rhenium powder, and 0.992 g of tungsten powder are blended with 0.0304 g of rhenium tribromide powder so that the rhenium tribromide powder is nearly homogeneously distributed throughout the mixture. Approximately 50 mg of the mixture is placed in a cylindrical mold having an inside diameter of 1.6 mm. The mixture is then pressed in the mold using hand pressure to form a disc-shaped pellet having a height of 1.99 mm. The pellet comprises about 500 µg of rhenium tribromide and has a density about 76% of the theoretical density of the mixture.

EXAMPLE 4

In an inert atmosphere, 1.0644 g of rhenium powder (−200 mesh) is blended with 0.3542 g of rhenium tribromide powder so that the rhenium tribromide powder is nearly homogeneously distributed throughout the mixture. Approximately 36 mg of the mixture is placed in a cylindrical mold having an inside diameter of 1.6 mm. The mixture is then pressed in the mold using hand pressure to form a disc-shaped pellet having a height of about 1.9 mm. The pellet comprises about 25 weight percent rhenium tribromide (about 9 mg) and has a density about 55% of the theoretical density.

EXAMPLE 5

In an inert atmosphere, 5.000 g of rhenium powder (−200 mesh) is blended with 0.0345 g of rhenium tribromide powder so that the rhenium tribromide powder is nearly homogeneously distributed throughout the mixture. Approximately 6 mg of the mixture is placed in a cylindrical mold having an inside diameter of 1.1 mm. The mixture is then pressed in the mold using hand pressure to form a disc-shaped pellet having a height of 0.43 mm. The pellet comprises about 45 µg of rhenium tribromide and has a density about 70% of the theoretical density of rhenium.

The pellets formed by the processes described in Examples 1 through 5 above are porous bodies that allow rhenium tribromide to escape as a gas at temperatures greater than about 200° C. The rate of rhenium tribromide evolution is negligible below about 200° C. The rate of rhenium tribromide evolution appears to be dependent upon several factors such as the density of the pellet, the percent rhenium tribromide by weight, temperature, pressure and pellet size.

FIGS. 3 through 6 illustrate the weight loss by sublimation of rhenium tribromide from the pellets formed according the Examples 1 through 4 respectively. The weight loss is believed to result from evaporation of rhenium tribromide.

The rhenium tribromide will decompose to rhenium and bromine at temperatures greater than about 400° C. so that the rhenium to deposit at the surface of the filament to inhibit well formation and the bromine may effect the tungsten regenerative cycle. This release is desirably a controlled release over time, and may extend over minutes, even hours, as a function of temperature.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A pelletized fill material for a halogen lamp comprising rhenium and bromine.

2. The lamp fill material of claim 1 comprising a bromide of rhenium.

3. The lamp fill material of claim 1 comprising rhenium tribromide.

4. A pelletized fill material for a halogen lamp comprising a mixture of a metal and a halide of rhenium.

5. The lamp fill material of claim 4 comprising a mixture of rhenium and rhenium tribromide.

6. The lamp fill material of claim 1 consisting essentially of rhenium and bromine.

7. The lamp fill material of claim 6 consisting essentially of a mixture of rhenium and rhenium tribromide.

8. A pellet suitable for delivering a predetermined amount of rhenium tribromide into a lamp, said pellet comprising a metal and rhenium tribromide.

9. The pellet of claim 8 wherein said metal has a melting temperature greater than about 1000° C. and does not react with rhenium tribromide to form a stable bromide.

10. The pellet of claim 8 wherein said metal comprises one or more metals from the group consisting of rhenium, palladium, platinum, rhodium, gold, molybdenum, and tungsten.

11. The pellet of claim 10 wherein said metal comprises rhenium.

12. The pellet of claim 10 wherein said metal comprises palladium.

13. The pellet of claim 10 wherein said metal comprises an alloy of two or more metals.

14. The pellet of claim 13 wherein said metal comprises an alloy of rhenium and palladium.

15. The pellet of claim 10 wherein said metal comprises a mixture of two or more metals.

16. The pellet of claim 8 consisting essentially of said metal and rhenium tribromide.

17. The pellet of claim 16 wherein said metal has a melting temperature greater than about 1000° C. and does not react with rhenium tribromide to form a stable bromide.

18. The pellet of claim 16 wherein said metal comprises one or more metals from the group consisting of rhenium, palladium, platinum, rhodium, gold, molybdenum, and tungsten.

19. The pellet of claim 18 wherein said metal comprises rhenium.

20. The pellet of claim 8 comprising between about zero weight percent and about 25 weight percent rhenium tribromide.

21. The pellet of claim 20 comprising about 0.5 weight percent rhenium tribromide.

22. The pellet of claim 8 forming a disc.

23. The pellet of claim 8 forming a sphere.

24. The pellet of claim 8 wherein no dimension of said pellet is greater than about 2 mm.

25. The pellet of claim 8 suitable for introduction into a lamp through a tube having an inside diameter of about 2 mm.

26. The pellet of claim 8 wherein the rhenium tribromide component of said pellet will sublime at temperatures greater than about 200° C.

27. The pellet of claim 26 wherein the rhenium tribromide component of said pellet will decompose at temperatures greater than about 400° C.

28. The pellet of claim 8 wherein the rhenium tribromide component of said pellet will decompose at temperatures greater than about 400° C.

29. A pellet suitable for delivering a predetermined amount of a halide of rhenium into the interior of the light emitting chamber of a lamp, said pellet comprising a metal and a halide of rhenium.

30. The pellet of claim 29 comprising rhenium tribromide.

31. The pellet of claim 29 wherein said metal comprises one or more metals from the group consisting of rhenium, palladium, platinum, rhodium, gold, molybdenum, and tungsten.

32. The pellet of claim 31 wherein said metal consists essentially of rhenium.

33. The pellet of claim 32 wherein the density of said pellet is between about 50% and about 100% of the density of pure rhenium.

34. The pellet of claim 32 comprising about 0.5 weight percent rhenium tribromide and about 99.5 weight percent rhenium.

35. The pellet of claim 29 comprising a mixture of metal powder and rhenium tribromide powder, wherein said metal does not react with said rhenium tribromide to form a stable bromide.

36. The pellet of claim 29 comprising between about 2 μg and about 2000 μg rhenium tribromide.

37. In a method of dosing a lamp with lamp fill material including the step of introducing a pellet comprising the lamp fill material into the interior of the light emitting chamber of the lamp, the improvement wherein the pellet comprises rhenium tribromide.

38. The method of claim 37 wherein said pellet consists essentially of rhenium and bromine.

39. The method of claim 37 wherein said pellet comprises a metal and rhenium tribromide.

40. The method of claim 39 wherein said metal comprises one or more metals from the group consisting of rhenium, palladium, platinum, rhodium, gold, molybdenum, and tungsten.

41. The method of claim 37 wherein said lamp is a halogen lamp having a tungsten filament.

42. In a method of introducing a predetermined amount of rhenium and a halogen into the interior of the light emitting chamber of a halogen lamp, the improvement comprising the step of introducing a pellet comprising rhenium tribromide into the interior of the chamber.

43. The method of claim 42 wherein said pellet comprises a metal and rhenium tribromide.

44. The method of claim 42 wherein said pellet material consists essentially of rhenium and rhenium tribromide.

45. A tungsten halogen lamp comprising:
a sealed light emitting chamber formed from light transmissive material;
a tungsten filament mounted internally of said chamber; and
a pellet internally of said chamber, said pellet comprising rhenium tribromide.

46. The lamp of claim 45 wherein said pellet comprises a metal and rhenium tribromide.

47. The lamp of claim 46 wherein said metal comprises one or more metals from the group consisting of rhenium, palladium, platinum, rhodium, gold, molybdenum, and tungsten.

48. The lamp of claim 47 wherein said pellet consists essentially of rhenium and rhenium tribromide.

49. The lamp of claim 47 wherein said pellet consists essentially of palladium and rhenium tribromide.

50. The lamp of claim 45 wherein said pellet sublimes at temperatures greater than about 200° C. and decomposes at temperatures greater than about 400° C.

51. The lamp of claim 45 wherein said pellet is mechanically mounted within the light emitting chamber.

52. The lamp of claim 51 wherein said pellet is mechanically secured within a wire coil.

53. A tungsten halogen lamp comprising:
a sealed light emitting chamber formed from light transmissive material;
a tungsten filament mounted internally of said chamber; and
a pellet internally of said chamber, said pellet comprising a metal and a halide of rhenium.

54. The lamp of claim 53 wherein said pellet consists essentially of rhenium and bromine.

55. The lamp of claim 53 wherein said pellet consists essentially of rhenium and rhenium tribromide.

56. The lamp of claim 53 wherein said pellet generally forms a disc.

57. The lamp of claim 53 wherein said pellet is mechanically secured within the chamber.

58. A halogen lamp comprising a lamp fill pellet mechanically secured in a fixed position within the light emitting chamber of the lamp so that there is substantially no relative movement between said pellet and said light emitting chamber.

59. The lamp of claim 58 wherein said pellet comprises rhenium tribromide.

60. The lamp of claim 58 wherein said pellet is mechanically secured within a glass tube integral with the chamber wall.

61. A pelletized fill material for a halogen lamp responsive to temperature for releasing bromine and rhenium over time.

* * * * *